United States Patent
Otaki et al.

(10) Patent No.: US 11,727,214 B2
(45) Date of Patent: Aug. 15, 2023

(54) SENTENCE CLASSIFICATION APPARATUS, SENTENCE CLASSIFICATION METHOD, AND SENTENCE CLASSIFICATION PROGRAM

(71) Applicant: Hitachi, Ltd., Tokyo (JP)

(72) Inventors: Hiroko Otaki, Tokyo (JP); Kunihiko Kido, Tokyo (JP)

(73) Assignee: HITACHI, LTD., Tokyo (JP)

( * ) Notice: Subject to any disclaimer, the term of this patent is extended or adjusted under 35 U.S.C. 154(b) by 352 days.

(21) Appl. No.: 16/815,147

(22) Filed: Mar. 11, 2020

(65) Prior Publication Data
US 2020/0302120 A1   Sep. 24, 2020

(30) Foreign Application Priority Data
Mar. 19, 2019  (JP) ................................ 2019-050859

(51) Int. Cl.
*G06F 40/30* (2020.01)
*G06N 5/04* (2023.01)
*G06N 20/00* (2019.01)

(52) U.S. Cl.
CPC .............. *G06F 40/30* (2020.01); *G06N 5/04* (2013.01); *G06N 20/00* (2019.01)

(58) Field of Classification Search
CPC .......... G06F 40/30; G06N 5/04; G06N 20/00; G06N 3/126; G06N 7/005
USPC .......................................................... 704/9
See application file for complete search history.

(56) References Cited

U.S. PATENT DOCUMENTS

| | | | |
|---|---|---|---|
| 7,349,899 B2* | 3/2008 | Namba | G06F 16/355 |
| 8,364,528 B2* | 1/2013 | Selinger | G06Q 30/0601 |
| | | | 705/14.24 |
| 8,583,524 B2* | 11/2013 | Selinger | G06Q 30/0244 |
| | | | 705/35 |
| 9,495,635 B2* | 11/2016 | Malik | G06F 16/338 |
| 10,303,999 B2* | 5/2019 | Hertz | G06N 20/00 |
| 10,643,227 B1* | 5/2020 | Gupta | G06Q 30/0204 |
| 10,860,566 B1* | 12/2020 | Romano | G06F 16/313 |
| 10,991,384 B2* | 4/2021 | Eyben | G10L 25/63 |
| 2003/0018629 A1* | 1/2003 | Namba | G06F 16/355 |
| 2004/0249664 A1* | 12/2004 | Broverman | G16H 10/20 |
| | | | 705/2 |

(Continued)

FOREIGN PATENT DOCUMENTS

JP  2017-111479 A  6/2017

*Primary Examiner* — Akwasi M Sarpong
(74) *Attorney, Agent, or Firm* — Mattingly & Malur, PC

(57) ABSTRACT

A sentence classification apparatus, a sentence classification method, and a sentence classification program that can appropriately classify sentences by adjusting parameters are provided. The sentence classification apparatus includes: a case sentence obtention unit for obtaining plural case sentences which are associated with effect values that are values obtained by evaluating effects; a case value creation unit for creating case values obtained by numerizing the case sentences for each of parameters with different values; a correlation coefficient calculation unit for calculating a correlation coefficient between the case values and the effect values for each of the values of the parameters; and a parameter selection unit for selecting a parameter among the parameters with different values on the basis of the correlation coefficient.

12 Claims, 15 Drawing Sheets

(56) References Cited

U.S. PATENT DOCUMENTS

| | | | |
|---|---|---|---|
| 2010/0223051 A1* | 9/2010 | Burstein | G06F 40/253 |
| | | | 704/9 |
| 2012/0089396 A1* | 4/2012 | Patel | G10L 25/00 |
| | | | 704/E15.005 |
| 2013/0060793 A1* | 3/2013 | Bandyopadhyay | G16H 10/60 |
| | | | 707/755 |
| 2013/0226610 A1* | 8/2013 | Broverman | G16H 70/60 |
| | | | 705/2 |
| 2014/0129152 A1* | 5/2014 | Beer | G16B 20/20 |
| | | | 702/19 |
| 2014/0344274 A1* | 11/2014 | Kido | G16H 70/60 |
| | | | 707/737 |
| 2018/0032666 A1* | 2/2018 | Sun | G16B 20/10 |
| 2018/0075012 A1* | 3/2018 | Allen | G16H 10/60 |
| 2019/0065576 A1* | 2/2019 | Peng | G06F 16/22 |
| 2020/0250212 A1* | 8/2020 | Macartney | G06F 16/3328 |
| 2020/0286596 A1* | 9/2020 | Yang | G16H 70/20 |

\* cited by examiner

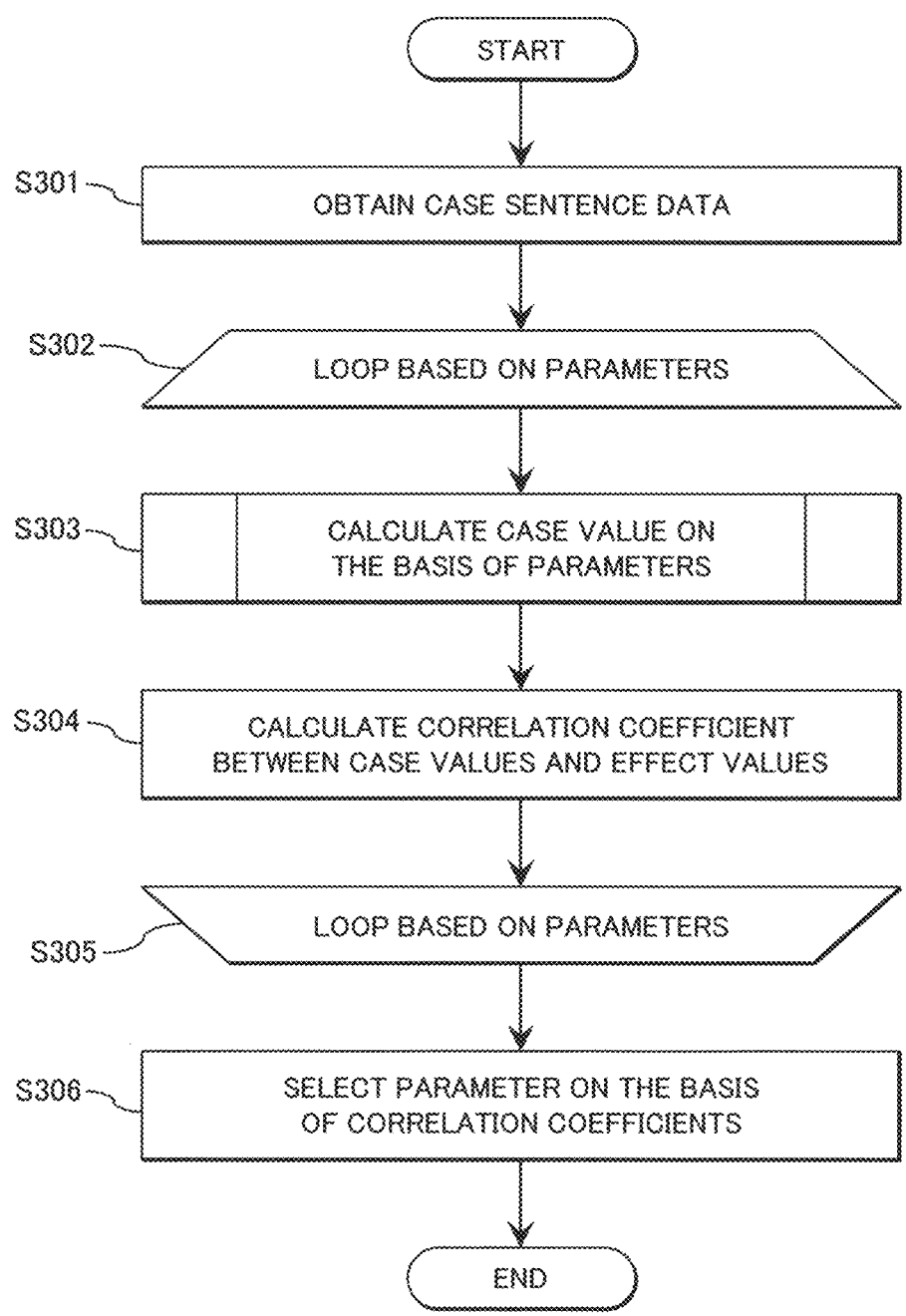

FIG. 4

| CASE SENTENCE ID (401) | CASE ID (402) | CATEGORY (403) | INPUT DATE (404) | DATA SOURCE (405) | CASE SENTENCE (CONDITION SENTENCE, OUTCOME SENTENCE) (406) |
|---|---|---|---|---|---|
| S0001 | C001 | Condition | 2011/01/04 | ClinicalTrials.gov | Men and women hypertensive patients, ages 55 and above. |
| S0002 | C001 | Condition | 2011/01/04 | ClinicalTrials.gov | HbA1c 7.5%-9% (if on more drugs) or 7.5%-11% (if on fewer drugs) |
| S0003 | C001 | Condition | 2011/01/04 | ClinicalTrials.gov | All subjects will be required to be over 60 kg in body weight. |
| S0004 | C002 | Condition | 2018/05/21 | PubMed | Age 12 to 17 years at the start of the study. |
| S0005 | C003 | Condition | 2012/03/14 | ClinicalTrials.gov | Age 12-17 years at study entry. |
| S0006 | C003 | Condition | 2012/03/14 | ClinicalTrials.gov | HbA1c greater than 13% |
| S0007 | C001 | Outcome | 2011/01/04 | ClinicalTrials.gov | Change in FPG (Fasting Plasma Glucose) |
| S0008 | C003 | Outcome | 2012/03/14 | ClinicalTrials.gov | Change in Fasting Plasma Glucose |
| S0009 | C001 | Outcome | 2011/01/04 | ClinicalTrials.gov | Change From Baseline in Body Weight |
| S0010 | C003 | Outcome | 2012/03/14 | ClinicalTrials.gov | Body Weight Change From Baseline |
| S0011 | C004 | Outcome | 2018/02/11 | ClinicalTrials.gov | Change in FPG |
| ⋮ | ⋮ | ⋮ | ⋮ | ⋮ | ⋮ |

FIG. 5

| CASE ID | CASE SENTENCE ID | CASE SENTENCE (OUTCOME SENTENCE) | EFFECT VALUE |
|---|---|---|---|
| C001 | S0007 | Change in FPG (Fasting Plasma Glucose) | 0.91 |
| C003 | S0008 | Change in Fasting Plasma Glucose | 0.72 |
| C001 | S0009 | Change From Baseline in Body Weight | 0.91 |
| C003 | S0010 | Body Weight Change From Baseline | 0.72 |
| C004 | S0011 | Change in FPG | 0.43 |
| ⋮ | ⋮ | ⋮ | ⋮ |

FIG. 6

600 — SETTING OF CONDITIONS FOR PARAMETER SELECTION

601 ◆ SETTING OF TARGET CASE
- TIME PERIOD: 2001 — 2019
- DATA SOURCE: ☑ Clinical Trials.gov ☐ PubMed ☐ EudraCT ☐ PMDA

◆ SETTING FOR TARGET CASE SENTENCE

DESIGNATION OF CONDITION SENTENCE

602
- CONDITION 1: Condition1
- CONDITION 2: Condition2

DESIGNATION OF OUTCOME SENTENCE, EFFECT VALUE

603
- OUTCOME SENTENCE: Outcome1 (604)
- EFFECT VALUE: Effect Size (605)

DESIGNATION OF STATISTICAL ANALYSIS

606
- TECHNIQUE: MIC

DESIGNATION OF PARAMETER SEARCHING RANGE

607
- CONDITION 1: Window size | MINIMUM VALUE 5 | MAXIMUM VALUE 15 | INTERVAL 5
- CONDITION 2: Dimension | MINIMUM VALUE 50 | MAXIMUM VALUE 300 | INTERVAL 50

608 BREAKDOWN EXECUTION

*FIG. 9*

| PARAMETER ID | WINDOW SIZE | DIMENSION NUMBER | CORRELATION COEFFICIENT |
|---|---|---|---|
| 001 | 5 | 50 | 0.82 |
| 002 | 10 | 50 | 0.63 |
| 003 | 15 | 50 | 0.44 |
| 004 | 5 | 75 | 0.87 |
| 005 | 10 | 75 | 0.14 |
| 006 | 15 | 75 | 0.57 |
| 007 | 5 | 100 | 0.32 |
| 008 | 10 | 100 | 0.48 |
| ⋮ | ⋮ | ⋮ | ⋮ |

FIG. 10

```
┌─────────────────────────────────────────────────────────┐
│  CLASSIFICATION OUTCOME                      — ▢ ✕      │
│                                                         │
│  LIST OF CLASSIFICATION OUTCOMES                        │
│   ⦿  Age 12-17 years at study entry.                    │
│   ○  HbA1c 7.5%-9% (if on more drugs) or 7.5%-11%       │
│      (if on fewer drugs)                                │
│   ○  All subjects will be required to be over 60 kg     │
│      in body weight.                                    │
│                                                         │
│  DETAIL                                                 │
│   Age 18 to 75 years.                                   │
│   Age 21 or older.                                      │
│   Age of 18 - 75 years.                                 │
│   Age 20-70 years.                                      │
│   Aged 20-80 years.                                     │
│   Age 18-75 years.                                      │
│   At least 18 years of age at screening.                │
│   Men and women, ages 21 to 70 years.                   │
│   Age = 18-70 years.                                    │
│   Age 18 to 75 years.                                   │
│   Age 21 or older.                                      │
│   Age of 18 - 75 years.                                 │
│                                                         │
└─────────────────────────────────────────────────────────┘
```

1000 — window
1001 — List of classification outcomes
1002 — Detail

FIG. 12

| CASE SENTENCE ID | CASE ID | CATEGORY | PARAMETER ID | CLUSTER ID | CASE SENTENCE (CONDITION SENTENCE, OUTCOME SENTENCE) |
|---|---|---|---|---|---|
| S0001 | C001 | Condition | 001 | CC001 | Men and women hypertensive patients, ages 55 and above. |
| S0002 | C001 | Condition | 001 | CC002 | HbA1c 7.5%-9% (if on more drugs) or 7.5%-11% (if on fewer drugs) |
| S0003 | C001 | Condition | 001 | CC003 | All subjects will be required to be over 60 kg in body weight. |
| S0005 | C003 | Condition | 001 | CC001 | Age 12-17 years at study entry. |
| S0006 | C003 | Condition | 001 | CC002 | HbA1c greater than 13% |
| S0007 | C001 | Outcome | 001 | OC004 | Change in FPG (Fasting Plasma Glucose) |
| S0008 | C003 | Outcome | 001 | OC004 | Change in Fasting Plasma Glucose |
| S0009 | C001 | Outcome | 001 | OC005 | Change From Baseline in Body Weight |
| S0010 | C003 | Outcome | 001 | OC005 | Body Weight Change From Baseline |
| S0011 | C004 | Outcome | 001 | OC004 | Change in FPG |
| : | : | : | : | : | : |

FIG. 13

| CASE ID | OUTCOME CLUSTER ID | EFFECT VALUE | PARAMETER ID | CONDITION CLUSTER ID | | | |
|---|---|---|---|---|---|---|---|
| | | | | CC001 | CC002 | ... | CCN |
| C001 | OC004 | 0.91 | 001 | 1 | 1 | ... | 0 |
| C003 | OC004 | 0.72 | 001 | 1 | 1 | ... | 1 |
| C004 | OC004 | 0.43 | 001 | 0 | 0 | ... | 0 |
| : | : | : | : | : | : | : | : |

FIG. 14

| PARAMETER ID (901) | WINDOW SIZE (902) | DIMENSION NUMBER (903) | OUTCOME CLUSTER ID (1301) | CONDITION CLUSTER ID (1302) | CORRELATION COEFFICIENT (904) |
|---|---|---|---|---|---|
| 001 | 5 | 50 | OC004 | CC001 | 0.82 |
| 001 | 5 | 50 | OC004 | CC002 | 0.63 |
| 001 | 5 | 50 | OC005 | CC001 | 0.44 |
| 001 | 5 | 50 | OC005 | CC002 | 0.87 |
| 002 | 10 | 50 | OC003 | CC001 | 0.14 |
| 002 | 10 | 50 | OC003 | CC002 | 0.57 |
| 002 | 10 | 50 | OC006 | CC001 | 0.32 |
| 002 | 10 | 50 | OC006 | CC002 | 0.48 |
| : | : | : | : | : | : |

FIG. 15

| PARAMETER ID (901) | WINDOW SIZE (902) | DIMENSION NUMBER (903) | THRESHOLD (0.5) EXCEEDING NUMBER (1501) |
|---|---|---|---|
| 001 | 5 | 50 | 3 |
| 002 | 10 | 50 | 1 |
| : | : | : | : |

SENTENCE CLASSIFICATION APPARATUS, SENTENCE CLASSIFICATION METHOD, AND SENTENCE CLASSIFICATION PROGRAM

CLAIM OF PRIORITY

The present application claims priority from Japanese Patent Application JP 2019-050859 filed on Mar. 19, 2019, the content of which are hereby incorporated by references into this application.

BACKGROUND OF THE INVENTION

The present invention relates to automatic classification of sentences and more particularly to a sentence classification apparatus, a sentence classification method, and a sentence classification program that classify sentences on the basis of outcome evaluation values associated with the sentences.

There are many cases where various states and conditions of apparatuses and pieces of software are described in free text in the real society. For example, the conditions and the like of participants in clinical trials that are trials for investigating the therapeutic effects and safety of new medicines and ways for coping with the failures of instruments and the like are described in free text. In this case, in order to find out effective clinical trials or effective ways for coping with the failures, it is desired that the conditions of the participants in the trials, the ways for coping with the failures, and the like should be classified in an appropriate manner. In other words, if described free texts are appropriately classified, the effective clinical trials and the effective ways for coping can be found out easily, which brings about various kinds of benefits.

For example, Japanese Unexamined Patent Application Publication No. 2017-111479 discloses a clustering way where, in order to make it possible to deliver an advertisement sentence well-adapted to a user about the same advertisement target, plural advertisement sentences are clustered into plural clusters on the basis of the advertisement target. To put it concretely, the plural advertisement sentences are converted into so many vectors, and at the same time, the plural advertisement sentences are clustered into plural clusters on the basis of the advertisement target. A central vector is selected among the central vectors of the respective clusters in such a way that the selected central vector is similar to a user vector created from a text used by a user, and an advertisement sentence corresponding to the selected central vector is delivered.

SUMMARY OF THE INVENTION

Nevertheless, in Japanese Unexamined Patent Application Publication No. 2017-111479, the effects of parameters used at the time of converting sentences into vectors are not taken into consideration. In the process of converting a sentence into a vector, parameters such as the number of dimensions representing the number of components of the vector of the sentence, a window size representing the number of words used before and after a target word in the sentence, and the like are used, and the variations of such parameters bring about a great effect on the outcome of converting the sentence into a vector. In other words, if a sentence is converted into a vector while parameters are left unadjusted, there is a case where the sentence is not appropriately classified.

Therefore, an object of the present invention is to provide a sentence classification apparatus, a sentence classification method, and a sentence classification program that can appropriately classify sentences by adjusting parameters.

In order to achieve the abovementioned object, the present invention proposes a sentence classification apparatus used for classifying sentences (into classified groups) and includes: a case sentence obtention unit for obtaining plural case sentences which are associated with effect values that are values obtained by evaluating effects; a case value creation unit for creating case values obtained by numerizing the case sentences respectively for each of parameters with different values; a correlation coefficient calculation unit for calculating a correlation coefficient between the case values and the effect values for each of the values of the parameters; and a parameter selection unit for selecting a parameter among the parameters with different values on the basis of the correlation coefficient.

In addition, the present invention proposes a sentence classification method used for classifying sentences into classified groups and includes: a case sentence obtention step for obtaining plural case sentences which are associated with effect values that are values obtained by evaluating effects; a case value creation step for creating case values obtained by numerizing the case sentences for each of parameters with different values; a correlation coefficient calculation step for calculating a correlation coefficient between the case values and the effect values for each of the values of the parameters; and a parameter selection step for selecting a parameter among the parameters with different values on the basis of the correlation coefficient.

Furthermore, the present invention proposes a sentence classification program used for making a computer classify sentences into classified groups and includes: a case sentence obtention step for obtaining plural case sentences which are associated with effect values that are values obtained by evaluating effects; a case value creation step for creating case values obtained by numerizing the case sentences for each of parameters with different values; a correlation coefficient calculation step for calculating a correlation coefficient between the case values and the effect values for each of the values of the parameters; and a parameter selection step for selecting a parameter among the parameters with different values on the basis of the correlation coefficient.

According to the present invention, a sentence classification apparatus, a sentence classification method, and a sentence classification program that can appropriately classify sentences by adjusting parameters can be provided.

BRIEF DESCRIPTION OF THE DRAWINGS

FIG. 3 is a diagram showing an example of a process flow of the first embodiment;

FIG. 4 is a diagram showing an example of a data structure of case sentences;

FIG. 5 is a diagram showing an example of a data structure showing associating relations between outcome sentences and effect values;

FIG. 6 is a diagram showing an example of a condition setting screen used for parameter selection;

FIG. 9 is a diagram showing an example of a data structure showing associating relations between parameters and correlation coefficients;

FIG. 10 is a diagram showing an example of a display screen for displaying classification outcomes;

FIG. 12 is a diagram showing an example of a data structure of the clustering outcomes of case sentences;

FIG. 13 is a diagram showing an example of a data structure used for calculating correlation coefficients;

FIG. 14 is a diagram showing an example of a data structure showing associating relations between parameters and correlation coefficients for the respective clusters;

FIG. 15 is a diagram showing an example of a data structure used for parameter selection;

DETAILED DESCRIPTION OF THE PREFERRED EMBODIMENTS

Hereinafter, a preferable embodiment of a sentence classification apparatus, a sentence classification method, and a sentence classification program according to the present invention will be explained with reference to the accompanying drawings. Here, in the following explanations and accompanying drawings, components having the same functional configurations are given the same reference signs, and redundant explanations about these components are omitted.

First Embodiment

Figure 1:
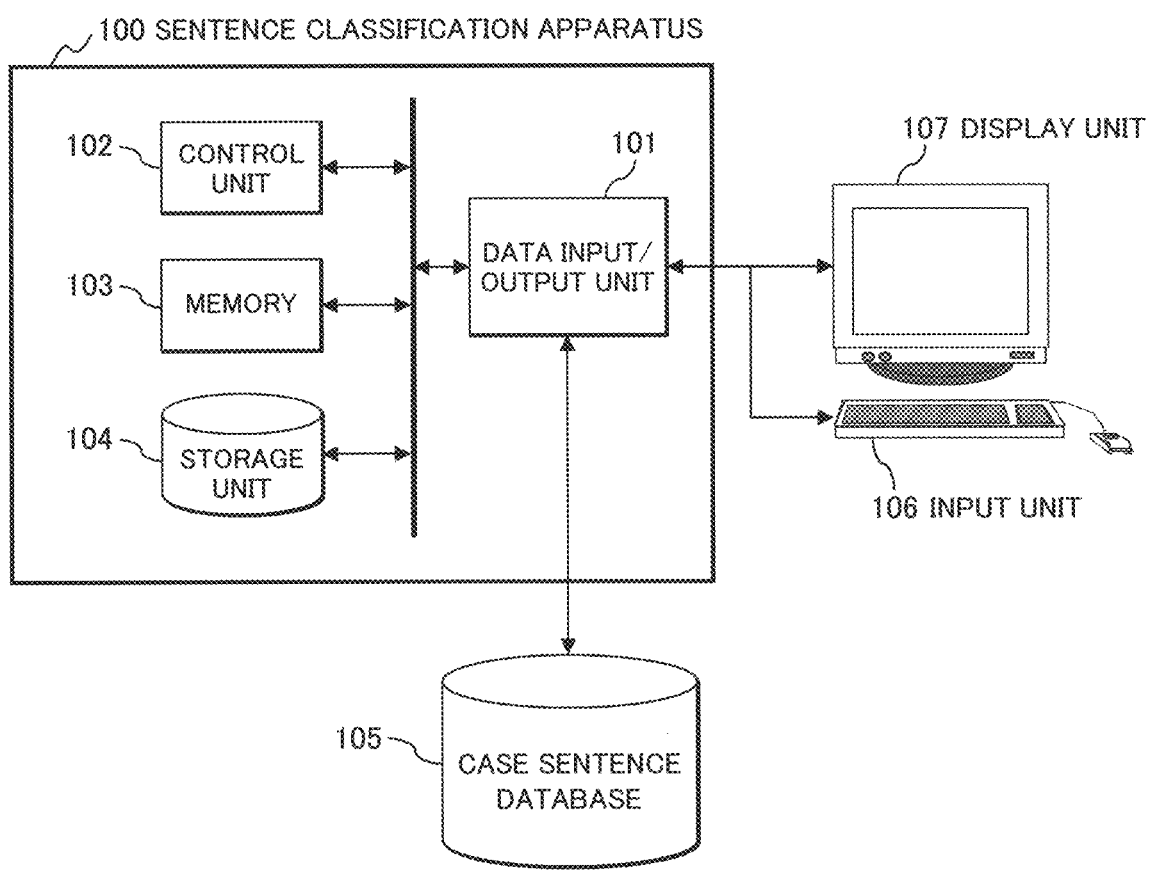
FIG. 1 is a block diagram of a sentence classification apparatus according to a first embodiment.

The hardware configuration of a sentence classification apparatus 100 according to this embodiment will be explained with reference to FIG. 1. The sentence classification apparatus 100 is a so-called computer, and, in concrete terms, includes: a data input/output unit 101; a control unit 102; a memory 103; and a storage unit 104, and the sentence classification apparatus 100 is connected to a case sentence database 105, an input unit 106, and a display unit 107. The abovementioned units will be explained below.

The data input/output unit 101 is an interface that transmits and receives various data to and from the case sentence database 105, the input unit 106, and the display unit 107. The display unit 107 is a device that displays the execution outcomes of programs and the like, and, in concrete terms, the display unit 107 is a liquid crystal display or the like. The input unit 106 is an operation device on which an operator executes operation instructions on the classification apparatus 100, and, in concrete terms, the input unit 106 is a keyboard, a mouse, or the like. A mouse can be replaced with another pointing device such as a track pad or a track ball. In addition, if the display unit 107 is a touch panel, the touch panel also works as the input unit 106. Data of various case sentences is stored in the case sentence database 105. An example of a data structure of case sentences will be described later with reference to FIG. 4.

The control unit 102 is a device for controlling the operations of the respective components, and, in concrete terms, the control unit 102 is a CPU (Central Processing Unit) or the like. The control unit 102 loads programs and data needed by the programs, which are stored in the storage unit 104, in the memory 103 and executes the programs. The memory 103 stores programs executed by the control unit 102, the transitional records of calculation processing, and the like. The storage unit 104 is a device that stores the programs executed by the control unit 102 and data needed for executing the programs, and, in concrete terms, the storage unit 104 is a device that reads or writes data from or to a recording device such as an HHD (Hard Disk Drive) or an SSD (Solid State Drive), or from or to a recording medium such as an IC card, an SD card, or a DVD.

Figure 2:
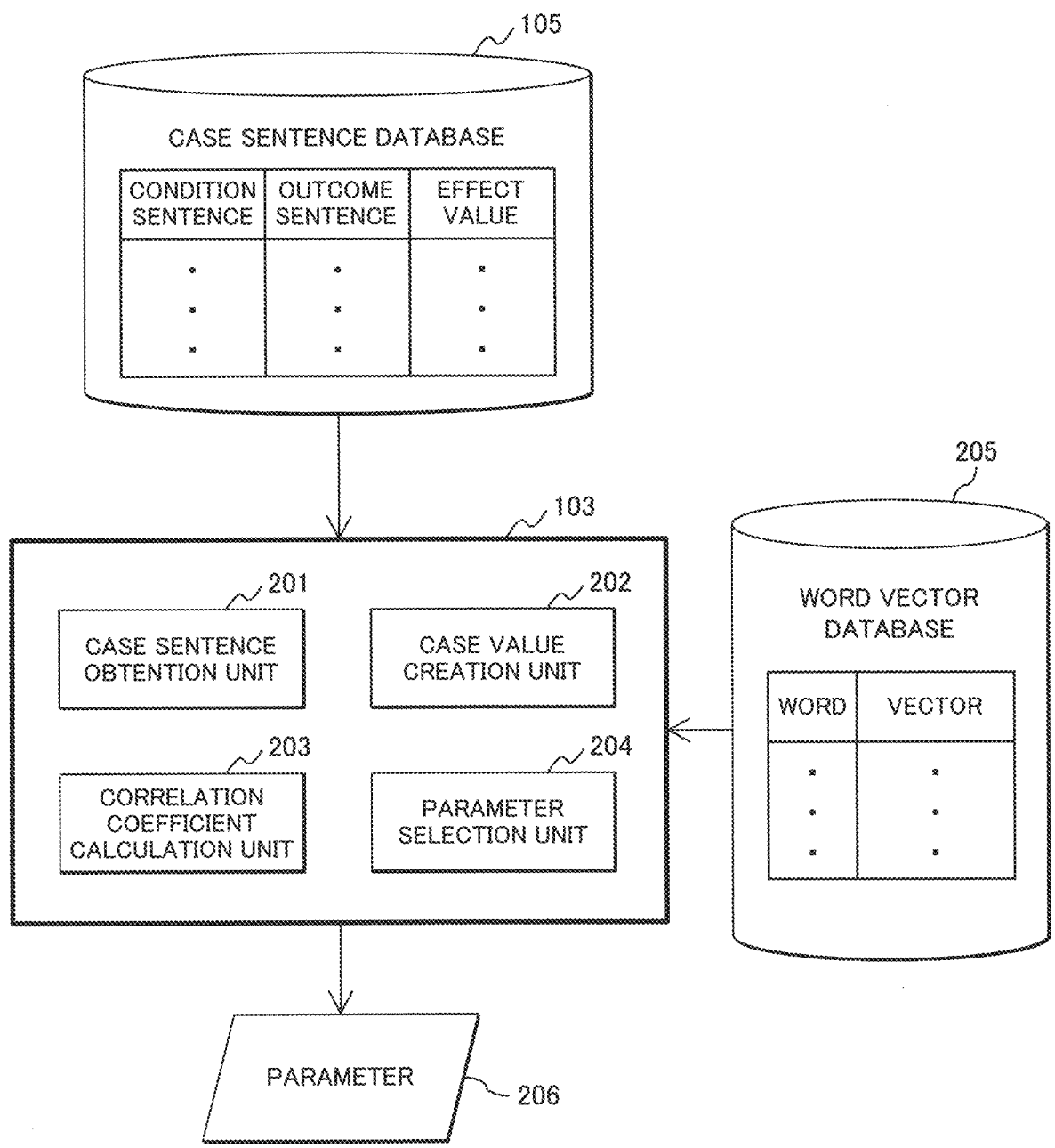
FIG. 2 is a functional block diagram of the first embodiment.

The functional block diagram of this embodiment will be explained with reference to FIG. 2. Here, the functions of this embodiment can be implemented by dedicated hardware using an ASIC (Application Specific Integrated Circuit), an FPGA (Field-Programmable Gate Array), or the like or can be implemented by software that works on the control unit 102. The following explanations will be made under the assumption that each of the functions is implemented by software. This embodiment includes a case sentence obtention unit 201, a case value creation unit 202, a correlation coefficient calculation unit 203, and a parameter selection unit 204. Each of the above units will be explained hereinafter.

The case sentence obtention unit 201 obtains plural case sentences associated with effect values that are values obtained by evaluating effects from the case sentence database 105 via the data input/output unit 101. A case sentence includes a condition sentence that shows a condition for a case and an outcome sentence that shows the outcome of the case. A condition sentence is, for example, a sentence that describes the states, conditions, and the like of participants in clinical trials of a new medicine in free text. An outcome sentence is, for example, a sentence that describes the changes of the states and the like of participants in clinical trials of a new medicine in free text. Effect values are associated with a condition sentence and an outcome sentence in advance.

The case value creation unit 202 creates case values by numerizing case sentences respectively for each of parameters with different values. A case sentence is numerized through processes through which a word string is created by decomposing the case sentence, word vectors are created by vectorizing the words, a sentence vector is created on the basis of the word vectors, and a case value is created on the basis of the sentence vector. Examples of processes through which case values are created will be described later with reference to FIG. 7.

In the creation of a word vector, a word vector database 205 in which words and word vectors are stored in such a way that each of the words is associated with a word vector is used. A word vector is a vector that represents the word with plural components, and the values of the components of two word vectors are given in such a way that the more similar the meanings of the two words are to each other, the larger a scalar product between the two words becomes. For example, it will be assumed that a word has three real number components, "disease" is represented by (0.44. 0.89, 0.02), "diabetes" is represented by (0.58, 0.80, 0.07), and "insulin" is represented by (0.89, 0.43, 0.10). In this case, because a scalar product between "disease" and "diabetes" 0.97 is larger than a scalar product between "disease" and "insulin" 0.87, it is understood that the meaning of "disease" is more similar to the meaning of "diabetes" than to the meaning of "insulin". In the word vector database 205, the preparation for appropriately defining the degrees of similarity among words is set in advance using, for example, LSI (Latent Semantic Indexing), tfidf, or word2vec.

Parameters are, for example, the number of dimensions that represents the number of components of the vector of a sentence and a window size that represents the number of words used before or after a target word in the sentence and they are used for creating a word vector or a sentence vector. Even if two case sentences are the same, if the values of the parameters of one sentence are different from those of the parameters of the other sentence, the case values of the two sentences are different from each other. Here, a value obtained by numerizing a condition sentence included in a case sentence is referred to as a condition value, and a value obtained by numerizing an outcome sentence is referred to as an outcome value.

The correlation coefficient calculation unit 203 calculates a correlation coefficient between case values and effect values for each of the values of parameters. For example, a Pearson's product moment correlation, a Spearman's rank correlation, a nonlinear correlation MIC (Maximum Information Coefficient), or the like is used for the calculation of a correlation coefficient.

The parameter selection unit 204 selects a parameter among parameters with different values on the basis of correlation coefficients. For example, a parameter that makes the absolute value of the correlation coefficient maximum is selected.

An example of a process flow of this embodiment will be explained with reference to FIG. 3.
(S301)

The case sentence obtention unit 201 obtains case sentence data from the case sentence database 105. The obtained case sentence data can be all the data stored in the case sentence database 105 or can be data extracted from the case sentence database 105 in accordance with a set condition.

With the reference to FIG. 4, an example of a data structure of case sentences stored in the case sentence database 105 will be explained. The data structure show in FIG. 4 includes some items, that is, Case Sentence ID 401; Case ID 402; Category 403; Input Date 404; Data Source 405; and Case Sentence 406. Hereinafter, each of the above items will be explained.

Case Sentence ID 401 shows identifiers for identifying the respective case sentences, and each case sentence is given a unique ID. In the case where all the data is obtained at this step, all the case sentence IDs are read by the case sentence obtention unit 201.

Case ID 402 shows identifiers for identifying the respective cases, and each case is given a unique ID, and there is a case where plural Case Sentence IDs are given to one Case ID. For example, while C002 in Case ID 402 is associated with S0004 in Case Sentence ID 401, C001 is associated with S0001 to S0003, S0007, and S0009.

Category 403 shows kinds of case sentence, and if a case sentence is a condition sentence, "Condition" is given, and if a case sentence is an outcome sentence, "Outcome" is given. Input Date 404 shows dates when cases are input. Data Source 405 shows data sources from which cases is originated. The abovementioned items can be used when a case sentence that meets a condition set by an operator is extracted. A condition setting screen used for setting a condition for extracting a case sentence will be explained later with reference to FIG. 6.

Case Sentence s themselves are given to Case Sentence 406. Here, a case sentence can be a word string such as "HbA1c greater than 13%" shown by S0006, for example, and it is not always necessary that a case sentence should meet, for example, a grammatical requirement for the case sentence to include a subject and a verb.

With reference to FIG. 5, an example of a data structure showing associating relations between outcome sentences and effect values included in case sentences. A data structure shown in FIG. 5 includes some items, that is, Case ID 402; Case Sentence ID 401; Case Sentence 406; and Effect Value 500. Case ID 402, Case Sentence ID 401, and Case Sentence 406 have already been explained with reference to FIG. 4.

Effect values that are values obtained by evaluating effects obtained in the respective cases are given to Effect Value 500. Because the same effect values are given to the same cases, the same effect values are given to S0007 and S0009 that have the same case IDs, and further the same effect values are given to S0008 and S0010 that have the same case IDs. Furthermore, an effect value is associated with a condition sentence via the relevant case ID.

With reference to FIG. 6, an example of a screen for setting conditions for parameter selection will be explained. A condition setting screen 600 shown in FIG. 6 includes a target case setting area 601, a condition designation area 602, an outcome designation area 603, an analysis designation area 606, a parameter range designation area 607, and a breakdown execution button 608.

In the target case setting area 601, as conditions for extracting a case sentence from the case sentence database 105, a time period within which the relevant case is input and a data source from which the relevant case originates are set. In addition, a condition sentence and an outcome sentence can be designated in the condition designation area 602 and in the outcome designation area 603 respectively as conditions for extracting a case sentence. For example, a kind of outcome sentence is designated in the outcome sentence designation unit 604 of the outcome designation area 603, and a kind of effect value is designated in the effect value designation unit 605 using pulldown menus respectively.

In the analysis designation area 606, a technique used when the correlation coefficient calculation unit 203 calculates a correlation coefficient is designated. In the parameter range designation area 607, kinds of parameter and parameter searching ranges used when the correlation coefficient calculation unit 203 calculates a correlation coefficient are designated.
(S302)

Processes from this step to S305 are repeated in accordance with combinations of parameters having different values. In other words, after certain values are set to parameters at this step, and processes to step S305 are executed, the flow goes back to this step and the values of the above parameters are updated. The combinations of the parameters are set, for example, on the basis of kinds of parameters and parameter searching ranges designated in the parameter range designation area 607 shown in FIG. 6. In FIG. 6, "Window size" is set from 5 To 15 at an interval of 5, and "Dimension" is set from 50 to 300 at an interval of 50, so that there are 18 (=3×6) combinations. In the processes from S302 to S305, processes regarding all the combinations of the parameters can be repeatedly executed, or a random search, Bayes optimization, a genetic algorithm, or the like can be used.
(S303)

The case value creation unit 202 calculates a case value on the basis of the values of the parameters set at S302. In other words, case sentences obtained at S301 are numerized respectively to create case values. Hereinafter, more detailed explanations about this step will be made.

Figure 7:
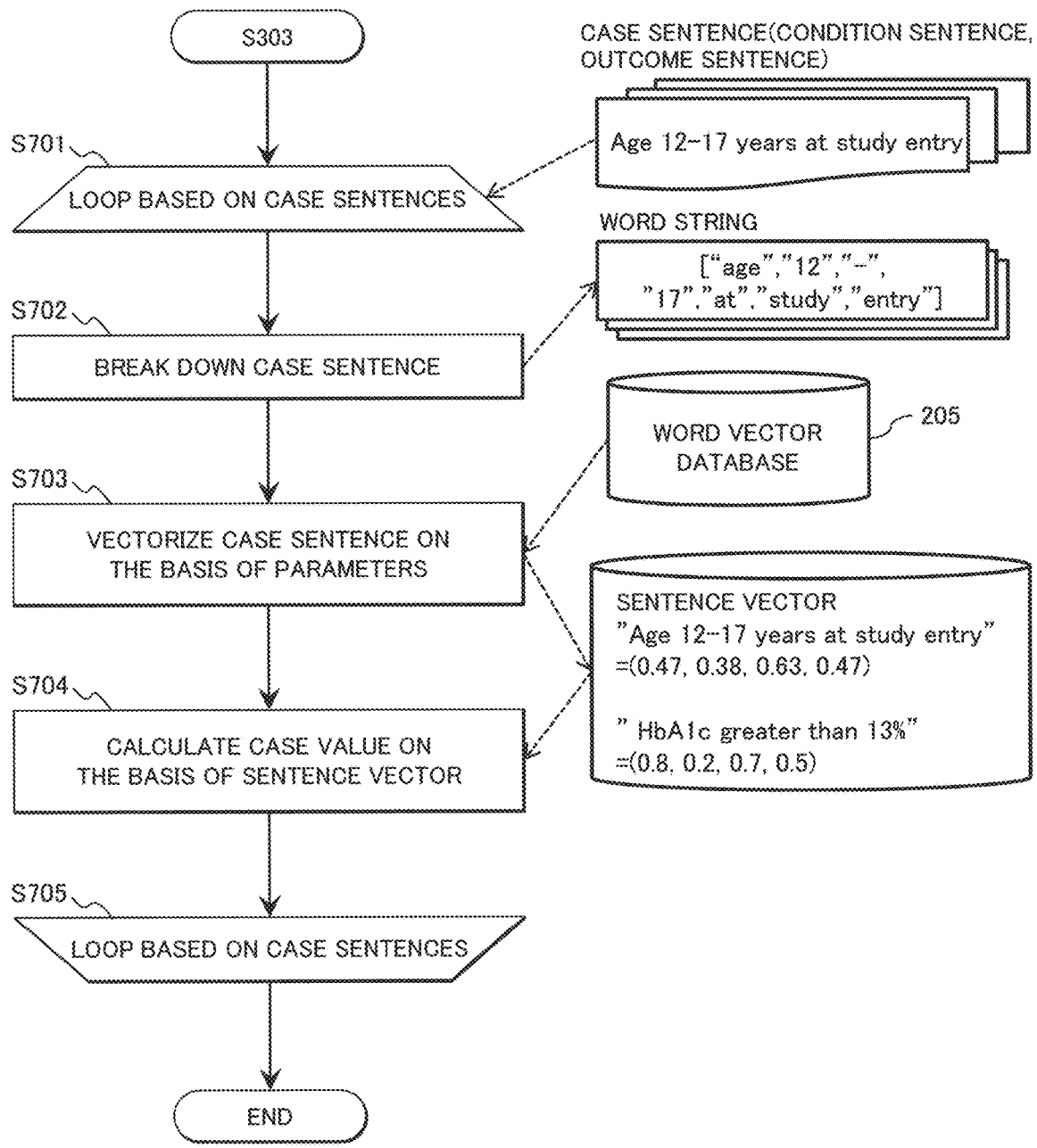
FIG. 7 is a diagram showing an example of a process flow for creating case values.

With reference to FIG. 7, an example of a process for creating a case value will be explained.

(S701)

Processes from this step to S705 are repeated every time a case sentence is read from case sentence data obtained at S301. In other words, after a certain case sentence, for example, "Age 12-17 years at study entry" is read at this step, and processes to S705 are finished, the flow goes back to this step and another case sentence is read.

(S702)

The case value creation unit 202 decomposes the case sentence. In other words, the case sentence read at S701 is decomposed into words using blank detection or morphological analysis, so that, for example, a word string ["age", "12", "-", "17", "at", "study", "entry"] is created.

(S703)

The case value creation unit 202 vectorizes the case sentence on the basis of the parameters. In other words, each word of the word string created at S702 is converted into a word vector with reference to the word vector database 205, and the components of the plural converted word vectors are averaged, so that a sentence vector, for example, a sentence vector (0.47, 0.38, 0.63, 0.47) is created. The sentence vector (0.47, 0.38, 0.63, 0.47) is an example of a sentence vector which is obtained by vectorizing the case sentence "Age 12-17 years at study entry".

(S704)

The case value creation unit 202 calculates a case value on the basis of the sentence vector. For example, the scalar product between a reference vector, which is a sentence vector defined in advance and works as a reference, and the sentence vector created at S702 is calculated as the case value.

(S705)

The flow is brought back to S701 until all case sentences are read at S701. When all the case sentences are read at S701, the flow of the processes for creating case values ends, and a process at S304 in FIG. 3 is started.

(S304)

The correlation coefficient calculation unit 203 calculates a correlation coefficient between the case values and the corresponding effect values. In other words, a correlation coefficient between the plural case values calculated at S303 and plural effect values, which correspond to case sentences from which the plural case values are originated respectively, is calculated. Because a correlation coefficient is calculated every time a loop is repeated for each parameter, a correlation coefficient is calculated for each of the values of parameters.

Figure 8:
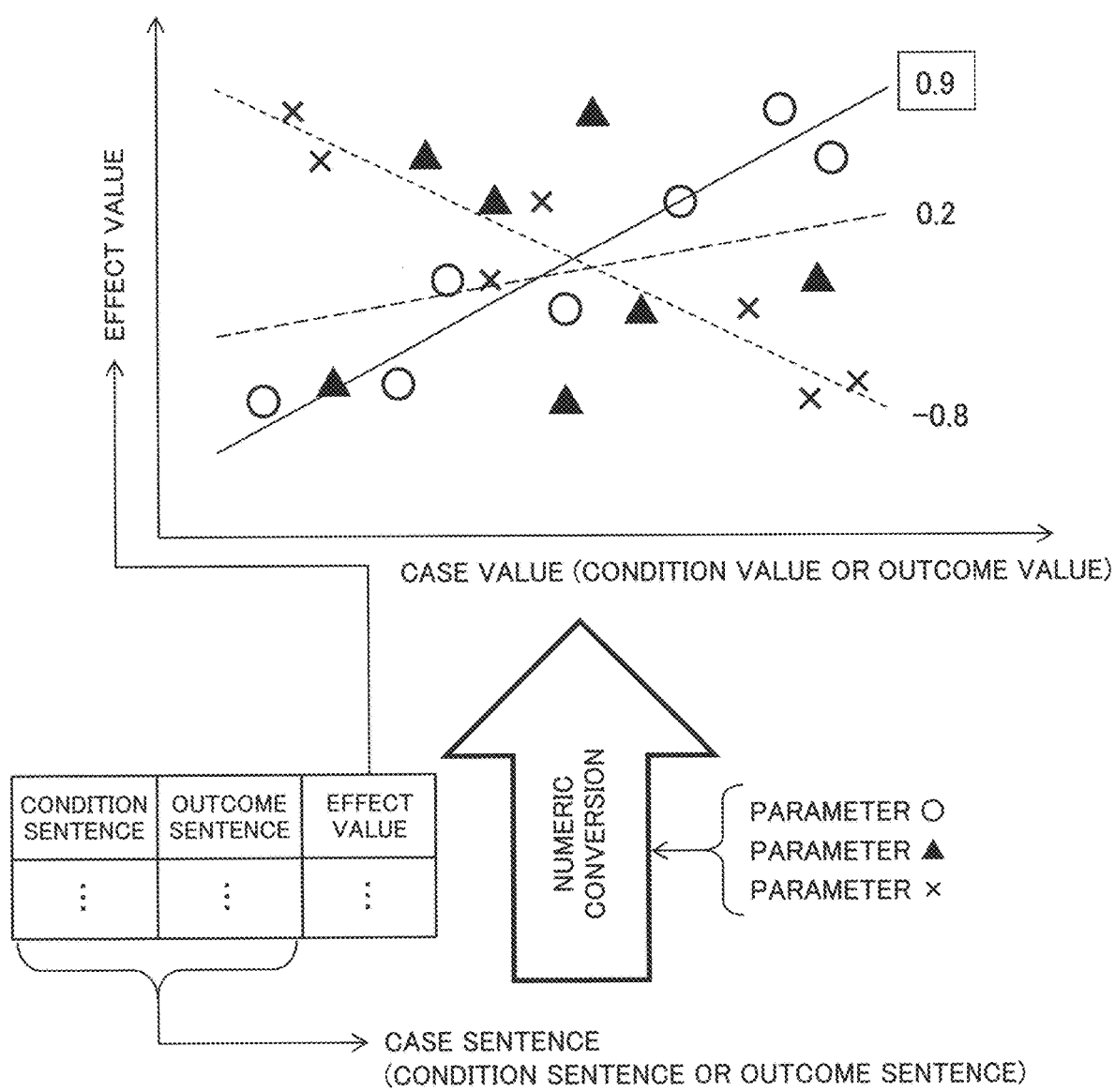
FIG. 8 is a diagram for explaining correlation coefficients between effect values and case values each of which is calculated for each parameter.

With reference to FIG. 8, correlation coefficients between the effect values and the corresponding case values will be explained, where the effect values and the case values are calculated for each parameter. A condition sentence or an outcome sentence, which is a case sentence and associated with an effect value, is numerized into a condition value or an outcome value by vectorization processing or the like, so that scatter diagrams are created using effect values and case values as shown in FIG. 8. Here, because the case values are changed in accordance with the values of parameters, a scatter diagram is created for each parameter, and a correlation coefficient is calculated for each of the values of parameters in the corresponding scatter diagram.

In FIG. 8, case values calculated in accordance with three parameters are depicted by ○, ▲, and x, and a correlation coefficient corresponding to ○ is calculated and proves to be 0.9, a correlation coefficient corresponding to ▲ proves to be 0.2, and a correlation coefficient corresponding to x proves to be −0.8. In other words, while there is almost no correlation between case values and effect values created in accordance with a parameter shown by ▲, there are high correlations between case values and effect values created in accordance with parameters ○ and x. A high correlation between case values and effect values means that the degrees of similarity among case sentences bringing about similar effect values are high, that is, that the case sentences are appropriately classified. In other words, the value of a parameter, which numerizes case sentences so that the absolute value of a correlation coefficient between the relevant case values and effect values becomes large, makes it possible to appropriately classify the case sentences.

(S305)

The flow is brought back to the process at S302 until the repetition number of the above processes reaches a repetition number set at S302, and the value of the parameter is updated. After the repetition number of the above processes reaches the repetition number set at S302, the flow proceeds to a process at S306.

(S306)

The parameter selection unit 204 selects a parameter on the basis of the correlation coefficients each of which is calculated for each of the values of the parameters. For example, a parameter that makes the absolute value of the relevant correlation coefficient maximum is selected.

With reference to FIG. 9, an example of a data structure showing associating relations between parameters and correlation coefficients. The data structure shown in FIG. 9 includes some items, that is, Parameter ID 901, Window Size 902, Dimension Number 903, and Correlation Coefficient 904. Parameter ID 901 shows identifiers for identify combinations of parameters, and each combination of parameters is given a unique ID. Window Size 902 shows the values corresponding to Window Size which is one of the parameters. Dimension Number 903 shows the values corresponding to Dimension Number which is one of the parameters. Correlation Coefficient 904 is given correlation coefficients calculated at S304 on the basis of combinations of the respective parameters.

At this step, with reference to a data structure as shown in FIG. 9, a parameter ID is extracted on the basis of correlation coefficients, and the values of parameters corresponding to the extracted parameter ID are selected. In FIG. 9, in the case where parameters that make the absolute value of the relevant correlation coefficient maximum are selected, "004" is extracted as a parameter ID, and a window size 5 and a dimension number 75 are selected as parameter values.

Through the above-described processes, parameters are adjusted so that case sentences can be appropriately classified. The sentence classification apparatus 100 classifies case sentences using the adjusted parameters and displays classification outcomes on the display unit 107.

With reference to FIG. 10, an example of a screen on which classification outcomes are displayed will be explained. A classification outcome display screen 1000 shown in FIG. 10 includes an outcome display area 1001 and a detailed data display area 1002.

In the outcome display area 1001, representative sentences each of which is a case sentence representing the relevant classified group are displayed as the list of classification outcomes as well as radio buttons used for selecting any one of the representative sentences. The display of the representative sentences for the respective classified groups makes it possible for an operator to check the outline of the classification outcomes from the representative sentence list. Each of the representative sentences is selected from plural case sentences included in the relevant classified group. For example, a case sentence nearest to the central vector of plural case sentences included in each classified group is selected as a representative sentence. Here, a central vector is a sentence vector created by averaging the components of plural sentence vectors.

In the detailed data display area 1002, the list of case sentences included in a classified group, to which a representative sentence selected by a radio button in the outcome display area 1001 belongs, is displayed. Because the list of case sentences included in each classified group is displayed, the operator can check the details of the classification outcomes.

According to this embodiment, because parameters used for numerizing case sentences are adjusted so that the degrees of similarity among case sentences bringing about similar effect values are high, the case sentences can be appropriately classified.

Second Embodiment

In the first embodiment, the above explanations are made about the case where correlation coefficients between effect values and case values are calculated while all the case sentences are dealt with in a uniform way. On the other hand, there are some cases where, when case sentences are classified into plural clusters, correlation coefficients are calculated and parameters are adjusted for each cluster, which leads to the improvement of the accuracy of the classification of the case sentences. In this embodiment, a technique in which case sentences are clustered into plural clusters and parameters are adjusted on the basis of a correlation coefficient for each cluster will be explained. Here, because the whole configuration of this embodiment is the same as that of the first embodiment, descriptions about the whole configuration of this embodiment are omitted.

Figure 11:
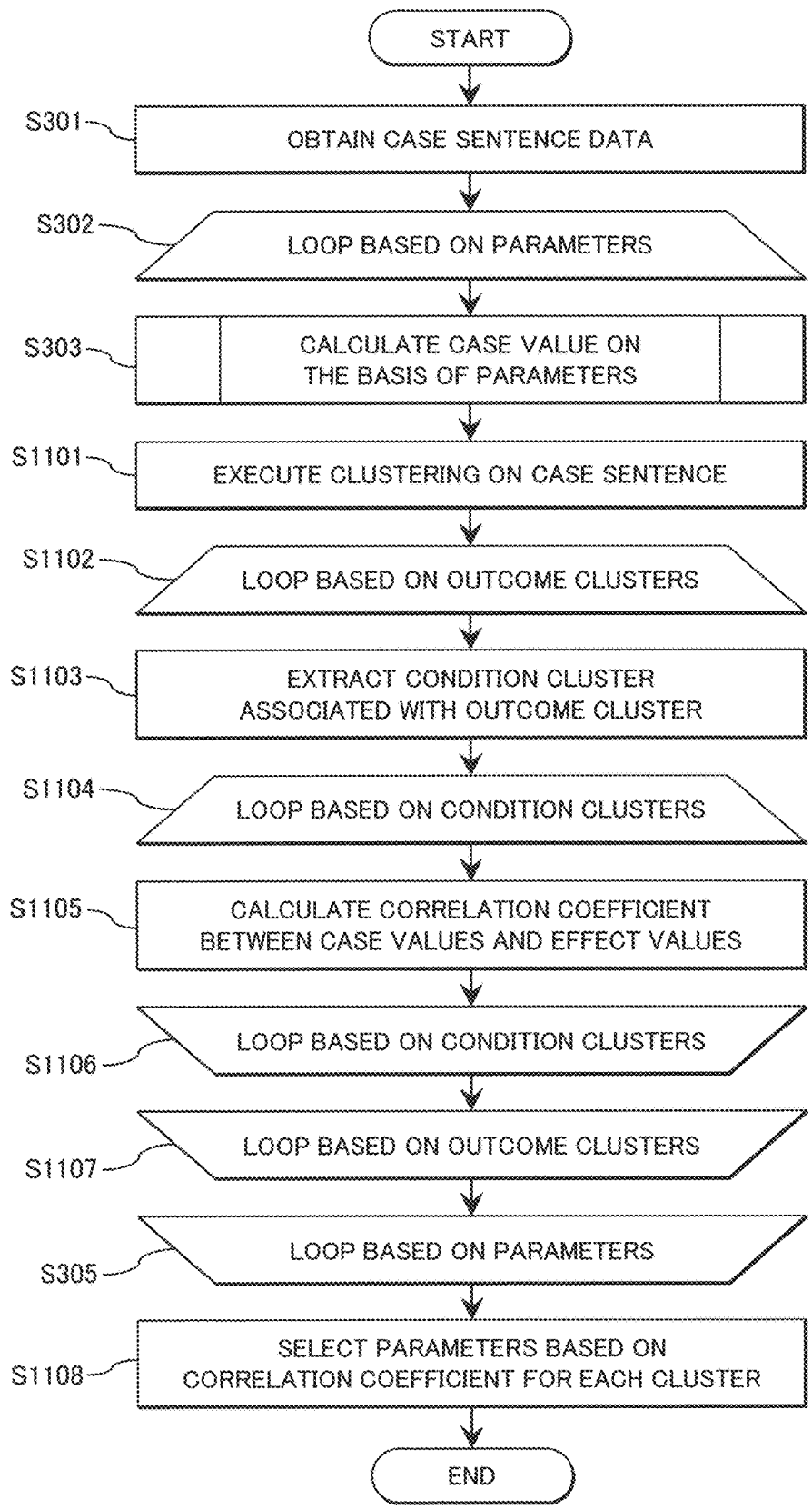
FIG. 11 is a diagram showing an example of a process flow of a second embodiment.

With reference to FIG. 11, an example of a process flow of this embodiment will be explained. Here, because S301 to S303, and S305 are the same as those of the first embodiment, explanations about these steps are omitted, and S1101 to S1107 added between S303 and S305, and S1108 added after S305 will be explained.
(S1101)

The case value creation unit 202 performs clustering on case sentences. In other words, the case sentences are classified into plural clusters on the basis of the degrees of similarity of sentence vectors created in the process of calculating case values at S303. It is desirable that clustering should be performed individually on condition sentences and on outcome sentences. Clusters obtained by clustering condition sentences are referred to as condition clusters, and clusters obtained by clustering outcome sentences are referred to as outcome clusters.

With reference to FIG. 12, an example of a data structure of clustering outcomes. The data structure shown in FIG. 12 includes some items, that is, Case Sentence ID 401, Case ID 402, Category 403, Parameter ID 901, Cluster ID 1201, and Case Sentence 406. Case Sentence ID 401, Case ID 402, Category 403, and Case Sentence 406 have already been explained using FIG. 4, and Parameter ID 901 has already been explained using FIG. 9.

Cluster ID 1201 shows identifiers for specifying the respective clusters, and each condition sentence or each outcome sentence is given a unique ID. For example, CC001 or the like is given as a condition cluster ID, and OC001 or the like is given as an outcome cluster ID. In FIG. 13, although the case ID of S0002 and the case ID of S0006 are different from each other, S0002 and S0006, both of which relate to "HbA1c", are classified into the same condition cluster CC002, and although the case ID of S0007, the case ID of S0008, and the case ID of S0011 are different from one another, S0007, S0008, and S0011, all of which relate to "FPG", are classified into the same outcome cluster CC004.
(S1102)

Processes from this step to S1107 are repeated in accordance with the outcome clusters classified at S1101. In other words, after a certain outcome cluster ID is set at this step, and processes to step S1107 are finished, the flow goes back to this step and another outcome cluster ID is set.
(S1103)

The case value creation unit 202 extracts a condition cluster associated with the outcome cluster. In other words, a condition cluster ID associated with a case ID corresponding to the outcome cluster ID set at S1102 is extracted.

With reference to FIG. 13, an example of a data structure of extracted outcomes will be explained below. The data structure shown in FIG. 13 includes some items, that is, Case ID 402, Outcome Cluster ID 1301, Effect Value 500, Parameter ID 901, and Condition Cluster ID 1302. Case ID 402, Effect Value 500, and Parameter ID 901 have already been explained with reference to FIG. 4, FIG. 5, and FIG. 9 respectively. The outcome cluster ID set at S1102 from the cluster IDs is given to Outcome Cluster ID 1301.

All the condition cluster IDs are provided to Condition Cluster ID 1302, and the presence or absence of condition clusters associated with the outcome cluster are shown for each case ID. To put it concretely, if there is a condition cluster associated with the outcome cluster, "1" is input into the relevant condition cluster ID, and if there is no condition cluster associated with the outcome cluster, "0" is input into the relevant condition cluster ID for each case ID. Whether or not there is a condition cluster associated with the outcome cluster is input on the basis of a clustering outcome as shown in FIG. 12. FIG. 13 shows that there are CC001 and CC002 corresponding to C001 and there are CC001, CC002, and CCN corresponding to C003 as condition cluster IDs associated with OC004. By configuring Condition Cluster ID 1302 as shown in FIG. 13, relations between each condition cluster ID and an effect value ID are represented in a matrix form, and a correlation coefficient for each cluster can be calculated on the basis of the relevant matrix and the column of the relevant effect value.

Here, it is conceivable that values input into Condition Cluster ID 1302 are numerical values included in condition sentences. For example, it is conceivable that the lower limit value of age 55 is extracted from the condition sentence of S0001 "Men and women hypertensive patients, ages 55 and above". Here, a numerical value extracted from a condition sentence is determined on the basis of an index for handling the condition sentence. For example, if "age" is made an index in the condition sentence S0001, "55" is extracted as a numerical value associated with "age" from the result of analyzing syntactic dependency of the condition sentence. Because numerical values extracted on the basis of the index are input into the column of Condition Cluster ID, relations between effect values and condition sentences for each case ID can be handled more minutely.
(S1104)

Processes from this step to S1106 are repeated in accordance with each condition cluster extracted at S1103. In other words, after a certain condition cluster ID is set at this step and the processes from this step to S1106 are finished, the flow goes back to this step and another cluster ID is set.
(S1105)

The correlation coefficient calculation unit 203 calculates a correlation coefficient between case values and effect values. In other words, a correlation coefficient for each cluster is calculated on the basis of a condition cluster that is associated with the outcome cluster and extracted at S1103. Because a correlation coefficient is calculated every time a loop based on parameters is repeated and every time a loop based on clusters is repeated, a correlation coefficient is calculated for each cluster for each of the values of the parameters.

With reference to FIG. 14, an example of a data structure of the calculation results of correlation coefficients will be explained. The data structure shown in FIG. 13 includes some items, that is, Parameter ID 901, Window Size 902, Dimension Number 903, Outcome Cluster ID 1301, Condition Cluster ID 1302, and Correlation Coefficient 904. The above items have already been explained with reference to FIG. 9 and FIG. 13. Here, correlation coefficients shown in FIG. 14 are calculated for the respective combinations of outcome clusters and condition clusters. In other words, the combinations of outcome clusters and condition clusters are set as case values, and correlation coefficients between the case values and effect values are calculated.
(S1106)

The flow is brought back to a process at S1104 until all the condition clusters extracted at S1103 are set, and another condition cluster ID is set. After all the extracted clusters are set, the flow proceeds to a process at S1107.
(S1107)

The flow is brought back to a process at S1102 until all the outcome clusters classified at S1101 are set, and another outcome cluster ID is set. After all the classification outcome clusters are set, the flow proceeds to a process at S305.
(S1108)

The parameter selection unit 204 selects parameters on the basis of a correlation coefficient calculated for each cluster. For example, the number of correlation coefficients that exceeds a certain threshold is counted for each parameter ID, and parameters are selected on the basis of count results. Alternatively, it is conceivable that the average value of correlation coefficients is calculated for each parameter ID, and parameters are selected on the basis of the average values of correlation coefficients for all the parameter IDs.

With reference to FIG. 15, an example of a data structure used for parameter selection will be explained. The data structure shown in FIG. 15 includes some items, that is, Parameter ID 901, Window Size 902, Dimension Number 903, and Threshold Exceeding Number 1501. Parameter ID 901, Window Size 902, and Dimension Number 903 have already been explained with reference to FIG. 9.

Threshold Exceeding Number 1501 is given the number of correlation coefficients, each of which is calculated for each cluster at S1105 and exceeds a threshold, for each parameter ID. The number of correlation coefficients, which are shown in FIG. 14 and exceed a threshold 0.5, is counted for each parameter ID and shown in FIG. 15. For example, in FIG. 14, in the cases where Parameter ID shows 001, because correlation coefficients of 00004-CC001, OC004-CC002, and OC005-CC002 exceed the threshold 0.5, Threshold Exceeding Number shows 3 in the row where Parameter ID shows 001 in FIG. 15.

In this step, by referring to a data structure as shown in FIG. 15, a parameter ID is extracted on the basis of a threshold exceeding number, which is the number of correlation coefficients exceeding the threshold for each parameter ID, and the values of parameters corresponding to the extracted parameter ID are selected. In FIG. 15, if parameters corresponding to the maximum threshold exceeding number are selected, "001" is selected as a parameter ID, and a window size 5 and a dimension number 50 are selected as the values of the parameters.

Through the flow of the above-described processes, clustering is performed on case sentences, and parameters are adjusted on the basis of correlation coefficients for each cluster, so that the accuracy of parameter adjustment can be improved. As a result, case sentences can be classified more appropriately.

Third Embodiment

In the first embodiment, the creation of case values from case sentences using the word vector database 205 prepared in advance has been explained. In this case, it is desirable that a word vector database 205 that is appropriate to numerized case sentences should be referred to. In this embodiment, how to create case values using the word vector database 205 that is appropriate to case sentences will be explained by creating the word vector database 205 through learning the case sentences. Here, because the whole configuration of this embodiment is the same as that of the first embodiment, an explanation about the whole configuration of this embodiment is omitted.

Figure 16:
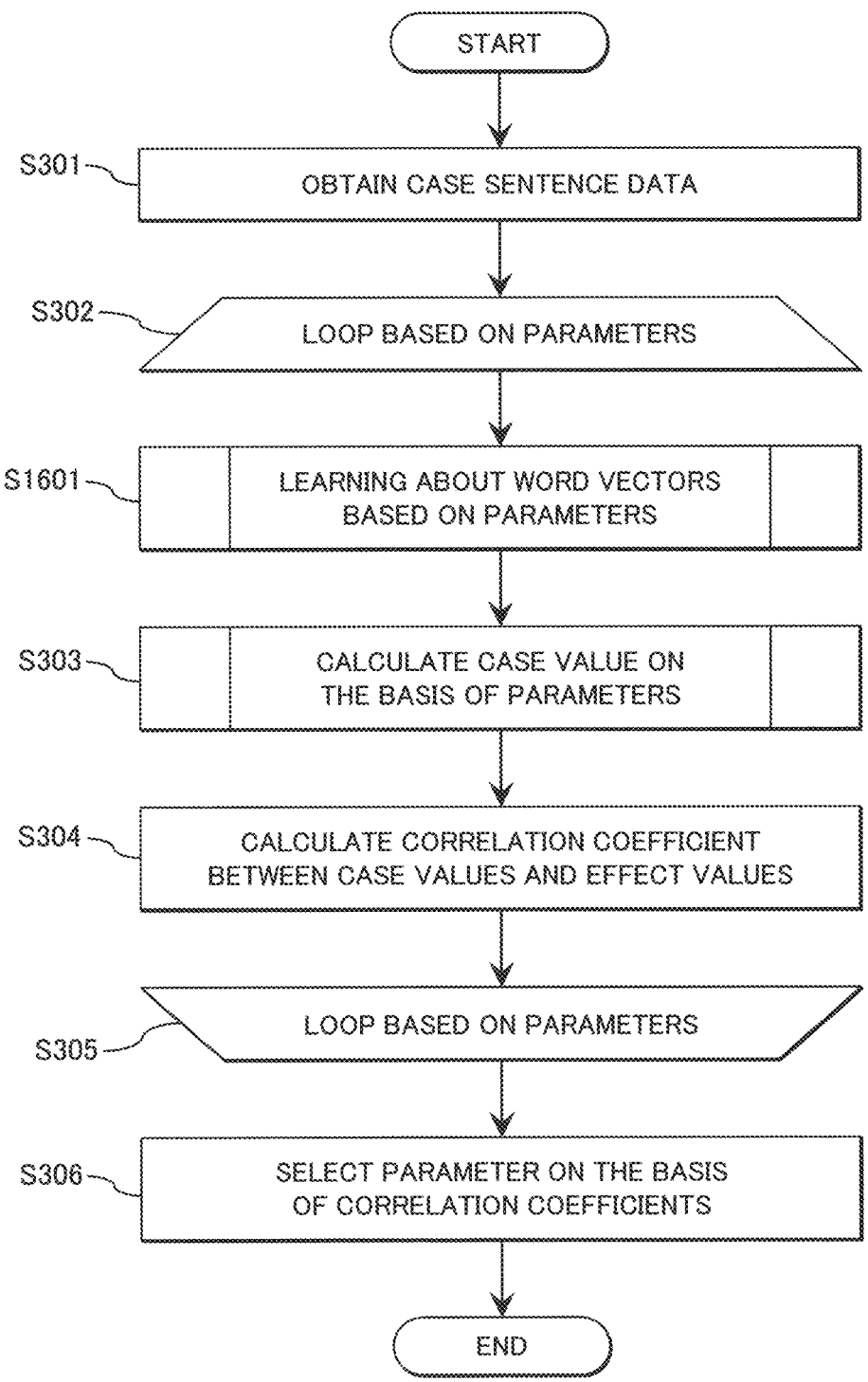
FIG. 16 is a diagram showing an example of a process flow of a third embodiment.

With reference to FIG. 16, an example of a process flow of a third embodiment will be explained. Here, because processes at S301 to S306 are the same as those at S301 to S306 in the first embodiment, explanations about them are omitted, and S1601 that is inserted between S302 and S303 will be explained.
(S1601)

A case value creation unit 202 learns word vectors on the basis of parameters. In other words, word vectors obtained by vectorizing words included in case sentences obtained at S301 are learned on the basis of parameters set at S302. In the following, a process executed at this step will be explained more minutely.

Figure 17:
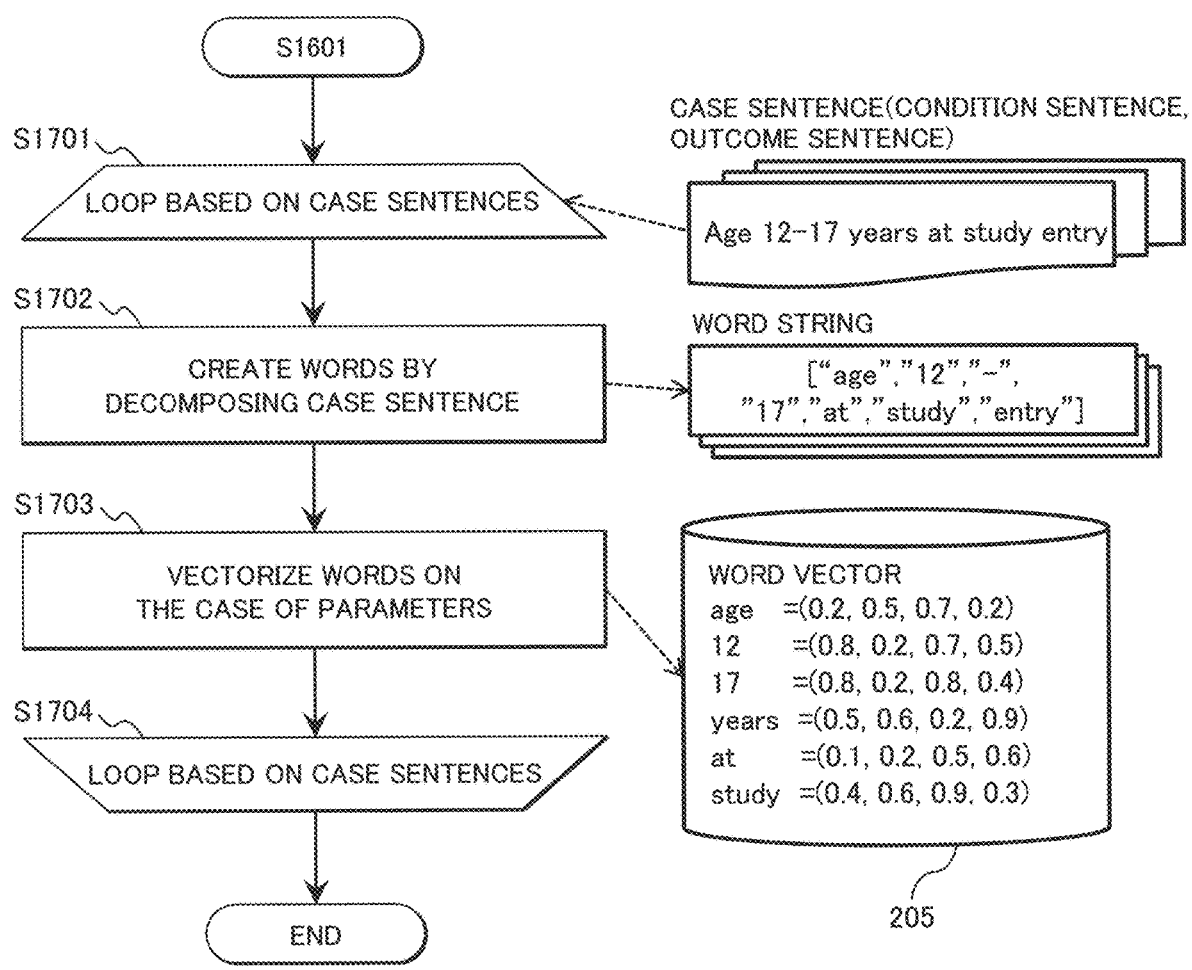
FIG. 17 is a diagram showing an example of a flow of learning word vectors.

With reference to FIG. 17, an example of a flow of the process of learning word vectors will be explained below.
(S1701)

Processes from this step to S1704 are repeated every time a case sentence is read from case sentence data obtained at S301. In other words, after a certain case sentence, for example, "Age 12-17 years at study entry" is read at this step, and processes to S1704 are finished, the flow goes back to this step, and another case sentence is read.
(S1702)

The case value creation unit 202 creates words by decomposing the case sentence. In other words, the case sentence read at S1701 is decomposed into words using blank detection or morphological analysis, so that, for example, a word string ["age", "12", "-", "17", "at", "study", "entry"] is created.
(S1703)

The case value creation unit 202 vectorizes the case sentence on the basis of the parameters. In other words, each word of the word string created at S1702 is converted into a word vector on the basis of the values of the parameters set at S302 in FIG. 16, so that a word vector (0.2, 0.5, 0.7, 0.2) is associated with a word "age", and a word vector (0.8, 0.2, 0.7, 0.5) is associated with a word "12". A processing result at this step is accumulated in the word vector database 205.
(S1704)

The flow is brought back to S1701 until all case sentences are read at S1701. When all the case sentences are read at S1701, the flow of the processes for learning word vectors ends, and a process at S303 in FIG. 16 is started.

Through the flow of the above-described processes, case values are created using the word vector database 205 created by learning case sentences, so that the accuracy of parameter adjustment can be improved. As a result, case sentences can be classified more appropriately.

Although plural embodiments according to the present invention have been explained so far, the present invention is not limited to these embodiments, and the present invention may include various kinds of modifications. For example, the above embodiments have been described in detail in order to explain the present invention in an easy-to-understand manner, and embodiments according to the present invention are not necessarily limited to embodiments which include all configurations that have been described so far. In addition, a part of the configuration of one embodiment can be replaced with a part of the configuration of another embodiment. Furthermore, it is also possible to add the configuration of one embodiment to the configuration of another embodiment. For example, it is conceivable that the second embodiment and the third embodiment are combined. In addition, a new embodiment according to the present invention may be made by deleting a part of the configuration of each embodiment, by adding another configuration to a part of the configuration of each embodiment, or by replacing a part of configuration of each embodiment with another embodiment.

REFERENCE SIGNS LIST

100: Sentence Classification Apparatus, 101: Data Input/Output Unit, 102: Control Unit, 103: Memory, 104: Storage Unit, 105: Case Sentence Database, 106: Input Unit, 107: Display Unit, 201: Case Sentence Obtention Unit, 202: Case Value Creation Unit, 203: Correlation Coefficient Calculation Unit, 204: Parameter Selection Unit, 205: Word Vector Database, 206: Parameter, 401: Case Sentence ID, 402: Case ID, 403: Category, 404: Input Date, 405: Data Source, 406: Case Sentence, 500: Effect Value, 600: Condition Setting Screen, 601: Target Case Setting Area, 602: Condition Designation Area, 603: Outcome Designation Area, 604: Outcome Sentence Designation Unit, 605: Effect Value Designation Unit, 606: Analysis Designation Area, 607: Parameter Range Designation Area, 608: Breakdown Execution Button, 901: Parameter ID, 902: Window Size, 903: Dimension Number, 904: Correlation Coefficient, 1000: Classification Outcome Display Screen, 1001: Outcome Display Area, 1002: Detailed Data Display Area, 1201: Cluster ID, 1301: Outcome Cluster ID, 1302: Condition Cluster ID, 1501: Threshold Exceeding Number

What is claimed is:

1. A sentence classification apparatus for classifying sentences into classified groups, comprising:
a case sentence obtention unit for obtaining a plurality of case sentences which are associated with effect values that are values obtained by evaluating effects;
a case value creation unit for creating respective case values, for each of the plurality of case sentences, obtained by vectorizing the case sentence based on a plurality of parameters having different values by converting each word of the case sentence into a word vector to create a sentence vector and calculate a scalar product between a reference vector and the sentence vector, each word vector having three or more real number components;
a correlation coefficient calculation unit for calculating a correlation coefficient between the case values and the effect values for each of the values of the parameters; and
a parameter selection unit for selecting a parameter among the parameters with different values based on an absolute value of the correlation coefficient having a maximum value,
wherein sentences that describe clinical trials and effective ways for coping with the failures are classified accordingly.

2. The sentence classification apparatus according to claim 1, further comprising a classification outcome display unit for displaying the outcome obtained by classifying the plurality of case sentences using the parameter selected by the parameter selection unit.

3. The sentence classification apparatus according to claim 2, wherein the classification outcome display unit displays representative sentences that are sentences representing classified groups respectively.

4. The sentence classification apparatus according to claim 3, wherein the classification outcome display unit includes a selection unit for selecting a classified group among the classified groups and displays a case sentence included in the classified group selected by the selection unit.

5. The sentence classification apparatus according to claim 1, wherein the case sentence obtention unit obtains a case sentence that meets a condition set on a condition setting screen where a condition for selecting the parameter is set.

6. The sentence classification apparatus according to claim 1, wherein the parameter selection unit selects a parameter that makes the absolute value of the correlation coefficient maximum.

7. The sentence classification apparatus according to claim 1, wherein the case value creation unit clusters sentences into a plurality of clusters;
the correlation coefficient calculation unit calculates a correlation coefficient for each cluster; and
the parameter selection unit selects the parameter on the basis of the correlation coefficient for each cluster.

8. The sentence classification apparatus according to claim 1,
wherein the case sentences include condition sentences showing the conditions for the cases and outcome sentences showing the outcomes of the cases respectively; and
the case value creation unit creates condition values obtained by numerizing the condition sentences and outcome values obtained by numerizing the outcome sentences.

9. The sentence classification apparatus according to claim 8,
wherein the case value creation unit clusters the condition sentences and the outcome sentences into the clusters of the condition sentences and the clusters of the outcome sentences respectively, and at the same time, extracts the clusters of the condition sentences associated with the clusters of the outcome sentences respectively,
the correlation coefficient calculation unit calculates the correlation coefficient for each of the extracted clusters of the condition sentences; and the parameter selection unit selects the parameter that makes the correlation coefficients between effect values associated with the clusters of the outcome sentences and the clusters of the condition sentences maximum.

10. The sentence classification apparatus according to claim 1, wherein the case value creation unit creates a word vector database in which words are associated with word vectors respectively for each of the parameters with different values on the basis of the case sentences obtained by the case sentence obtention unit and creates the case values using the word vector database.

11. A sentence classification method for classifying sentences into classified groups, comprising:
    a case sentence obtention step for obtaining a plurality of case sentences which are associated with effect values that are values obtained by evaluating effects;
    a case value creation step for creating respective case values, for each of a plurality of parameters having different values, obtained by vectorizing the case sentence based on a plurality of parameters having different values by converting each word of the case sentence into a word vector to create a sentence vector and calculate a scalar product between a reference vector and the sentence vector, each word vector having three or more real number components;
    a correlation coefficient calculation step for calculating a correlation coefficient between the case values and the effect values for each of the values of the parameters; and
    a parameter selection step for selecting a parameter among the parameters with different values based on an absolute value of the correlation coefficient having a maximum value,
    wherein sentences that describe clinical trials and effective ways for coping with the failures are classified accordingly.

12. A non-transitory computer readable medium that stores a sentence classification program used for making a computer classify sentences into classified groups, comprising:
    a case sentence obtention step for obtaining a plurality of case sentences which are associated with effect values that are values obtained by evaluating effects;
    a case value creation step for creating respective case values, for each of the plurality of case sentences, obtained by vectorizing the case sentence based on a plurality of parameters having different values by converting each word of the case sentence into a word vector to create a sentence vector and calculate a scalar product between a reference vector and the sentence vector, each word vector having three or more real number components;
    a correlation coefficient calculation step for calculating a correlation coefficient between the case values and the effect values for each of the values of the parameters; and
    a parameter selection step for selecting a parameter among the parameters with different values based on an absolute value of the correlation coefficient having a maximum value,
    wherein sentences that describe clinical trials and effective ways for coping with the failures are classified accordingly.

* * * * *